UNITED STATES PATENT OFFICE.

EMILE GEILLE, OF BRUSSELS, BELGIUM.

PROCESS OF MAKING GLASS OBJECTS OF WASTE GLASS.

SPECIFICATION forming part of Letters Patent No. 687,012, dated November 19, 1901.

Application filed March 28, 1901. Serial No. 53,307. (No specimens.)

*To all whom it may concern:*

Be it known that I, EMILE GEILLE, manufacturer, a subject of the King of Belgium, residing at Brussels, in the Kingdom of Belgium, have invented new and useful Improvements in Processes of Making Glass Objects of Glass Waste, (for which patents have been filed in Belgium August 29, 1900, No. 151,823; in France February 28, 1901, number of certificate 297,029; in Great Britain March 2, 1901, No. 4,495, and in Germany March 5, 1901, number of certificate 22,651,) of which the following is a full, clear, and exact description.

The object of the present invention is to economically manufacture all kinds of decorative objects by means of a special process, utilizing all glass waste—such as crucible bottoms, scraps of rolled or crown-glass, and in general all glasses or glass scraps which can no longer be utilized for making crown glass. According to this new process of glasswork the scraps are melted to a uniform tint by mixing fifteen per cent. of a certain compound before they are put into the crucibles. This compound may consist of any usual flux—such as sand, limestone, soda, fluor-spar, and feldspar—in convenient proportions. As the objects to be attained are opaque and are produced in the first place by pressing them into a rough shape in order to subject them to various finishing processes, it is not necessary to melt them until they are completely refined, as under these circumstances the impurity of the glass, bubbles, or spots do not matter. Consequently the molten mass can be worked as soon as it is sufficiently liquid to allow of the various novel operations of transformation and decoration which form the characteristics of the new product. This only takes about half the time requisite for complete melting, which effects an economy of about fifty per cent. of fuel. The partly molten or fluid glass is poured into suitable fire-resisting molds, which, owing to the nature of the product, need not be polished, which is a second advantage as regards economy, and then each mold is placed under a suitable press, which forces the molten substance to take the form of the mold in every part. When casings are being made, pressure is also used to fix a rough vitreous substance to one of the surfaces in order to allow it to adhere to the walls or masonry to be decorated. For this purpose fragments of glass of suitable size are scattered thinly on the surface of the plate or object which has received the first pressure, the said fragments being then pressed again a second time, which makes them penetrate into the still yielding or plastic mass to a sufficient depth to retain and fix them there, while the projecting portions serve to stick the plaques into the masonry. The article is then taken out of the mold for finishing the opposite or right side, which is exposed to the heat of a suitable furnace for a longer or shorter period, according as it is desired to make it more or less brilliant. To obtain articles with a dull surface, it is sufficient to expose them to heat for only a few minutes. Plain articles and of one color thus finished are sent to the furnace to be heated in the ordinary course. If instead of pieces in a plain color it is desired to make objects marbled in various colors, a few grams of coloring oxids giving the requisite tint are added to the vitreous mass before the pressing operation, care being taken to stir the mass with an iron bar.

Articles may be decorated by means of a very simple process, also emanating from the method of manufacture by means of pressure. In this case the mold is cut so that the interior shows the design in grooves, which are reproduced as raised ribs on the vitreous articles submitted to the press. These ribs are intended to keep in place the powdered colored glass, which is more fusible than the substance of the article itself and which is applied thereto by aid of a sifter having the same design as the article, which is then slowly heated in the furnace until the colors adhere perfectly.

I claim—

1. A process for making an opaque vitreous product consisting in making a vitreous mass by melting scraps of glass mixed with a suitable composition, molding this mass to the desired shape, applying fragments of vitreous material to the surface of the molded article while it is in a plastic condition, again pressing the molded article and then reheating the same.

2. A process for making an opaque vitreous product consisting in making a vitreous mass by melting scraps of glass mixed with a suitable composition, molding the mass to the desired shape, and with superficial ribs to form a surface adapted to retain particles placed thereon, applying fragments of vitreous material to the surface of the molded article while it is in a plastic condition, again pressing the molded article and then reheating the same.

In witness whereof I have hereunto set my hand in presence of two witnesses.

EMILE GEILLE.

Witnesses:
 AUG. MERISSEN,
 GREGORY PHELAN.